United States Patent
Kuroki et al.

(10) Patent No.: US 9,896,103 B2
(45) Date of Patent: Feb. 20, 2018

(54) VEHICLE DRIVE CONTROLLER

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 461 days.

(21) Appl. No.: 14/439,408

(22) PCT Filed: Oct. 31, 2012

(86) PCT No.: PCT/JP2012/078226
§ 371 (c)(1),
(2) Date: Apr. 29, 2015

(87) PCT Pub. No.: WO2014/068718
PCT Pub. Date: May 8, 2014

(65) Prior Publication Data
US 2015/0298700 A1    Oct. 22, 2015

(51) Int. Cl.
*B60W 30/18* (2012.01)
*F02D 13/06* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC ............... B60W 10/06; B60W 10/02; B60W 2030/18081; B60W 2030/1809;
(Continued)

(56) References Cited

U.S. PATENT DOCUMENTS 9,181,914 B2 * 11/2015 Carvignese .............. B60K 6/24

FOREIGN PATENT DOCUMENTS

JP    2002-227885 A    8/2002

OTHER PUBLICATIONS

International Search Report dated Dec. 4, 2012 in PCT/JP2012/078226 Filed Oct. 31, 2012.

* cited by examiner

*Primary Examiner* — Erin D Bishop
(74) *Attorney, Agent, or Firm* — Oblon, McClelland, Maier & Neustadt, L.L.P.

(57) ABSTRACT

A running control device of a vehicle includes an engine with cylinders, a clutch connecting/disconnecting a power transmission path between the engine and wheels, and a variable mechanism to vary an intake air amount sucked into the cylinders. The running control device performs a normal running mode by transmitting engine drive force to the wheels, a neutral inertia running mode by disconnecting the power transmission path between the engine and the wheels, and a cylinder resting inertia running mode by resting at least a part of the cylinders while the power transmission path between the engine and the wheels is connected. The running control device makes the intake air amount sucked into the cylinders larger at the time of return from the neutral inertia running mode to the normal running mode as compared to the case of return from the cylinder resting inertia running mode to the normal running mode.

3 Claims, 7 Drawing Sheets

(51) Int. Cl.

| | |
|---|---|
| *F02D 13/02* | (2006.01) |
| *F02D 41/12* | (2006.01) |
| *F02D 41/00* | (2006.01) |
| *F02D 13/04* | (2006.01) |
| *F02D 29/02* | (2006.01) |
| *B60W 10/02* | (2006.01) |
| *B60W 10/06* | (2006.01) |
| *B60W 30/20* | (2006.01) |

(52) U.S. Cl.
CPC ......... *B60W 30/20* (2013.01); *F02D 13/0211* (2013.01); *F02D 13/0219* (2013.01); *F02D 13/04* (2013.01); *F02D 13/06* (2013.01); *F02D 29/02* (2013.01); *F02D 41/0002* (2013.01); *F02D 41/0005* (2013.01); *F02D 41/12* (2013.01); *F02D 41/126* (2013.01); *B60W 2030/1809* (2013.01); *B60W 2030/18081* (2013.01); *B60W 2030/206* (2013.01); *F02D 13/0261* (2013.01); *F02D 13/0269* (2013.01); *F02D 2041/001* (2013.01); *Y02T 10/142* (2013.01); *Y02T 10/42* (2013.01)

(58) Field of Classification Search
CPC ..... B60W 2030/206; B60W 30/18072; B60W 30/20; F02D 41/0002; F02D 41/0005; F02D 41/12; F02D 41/123; F02D 41/126; F02D 2041/001; F02D 13/0211; F02D 13/0207; F02D 13/0226; F02D 13/023
See application file for complete search history.

| RUNNING MODE | ENGINE 12 | CLUTCH C1 | ENGINE BRAKE FORCE |
|---|---|---|---|
| NORMAL RUNNING | ROTATIONALLY DRIVEN | ENGAGEMENT | NO |
| NEUTRAL INERTIA RUNNING | IDLE ROTATION (ROTATION STOP) | RELEASE | NO |
| CYLINDER RESTING INERTIA RUNNING | F/C | ENGAGEMENT | SMALL |

VEHICLE DRIVE CONTROLLER

TECHNICAL FIELD

The present invention relates to a running control device of a vehicle and particularly to reacceleration performance improvement and shock suppression at the time of return from an inertia running mode to a normal running mode.

BACKGROUND ART

With regard to an engine brake running mode performed with engine brake applied by driven rotation of an engine while a power transmission path between the engine and wheels is kept connected, to execute an inertia running mode performed with an engine brake force made lower than that of an engine brake running mode is conceived for extending a running distance and contributing to improvement in fuel consumption. A device described in Patent Document 1 is an example thereof and a control device is described that performs, for example, a neutral inertia running mode performed with a power transmission path disconnected between an engine and wheels, thereby eliminating the engine brake so as to extend a running distance and contribute to improvement in fuel consumption. Although not depicted in Patent Document 1, another known method of reducing an engine brake force to extend a running distance and contribute to improvement in fuel consumption is a cylinder resting inertia running mode performed by resting at least a part of cylinders of the engine while the power transmission path is kept connected between the engine and the wheels. Resting some of the cylinders in this way reduces a pumping loss generated during driven rotation of pistons, resulting in a reduced engine brake force.

PRIOR ART DOCUMENT

Patent Document

Patent Document 1: Japanese Laid-Open Patent Publication No. 2002-227885

SUMMARY OF THE INVENTION

Problem to be Solved by the Invention

In Patent Document 1, it is described that a return to a normal running mode is made when a return condition is satisfied during a neutral inertia running mode and, with regard to the control at the time of return, that a rotation speed of an engine is first increased to make a rotation speed difference smaller between both elements of a clutch disposed in a power transmission path between the engine and wheels followed by connecting the clutch. Since the power transmission path between the engine and the wheels is separated in the neutral inertia running mode, a rotation speed difference is generated between rotating elements of the clutch connecting/disconnecting the engine and the wheels. Therefore, at the time of return from the neutral inertia running mode to the normal running mode for performing reacceleration, the rotation speed of the engine is increased to make the rotation speed difference of the clutch smaller before connecting the clutch, thereby suppressing a shock generated at the time of return to the normal running mode. On the other hand, the clutch connecting/disconnecting the power transmission path between the engine and the wheels remains connected in the cylinder resting inertia running mode described above. Therefore, no rotation speed difference is generated in the clutch. Thus, at the time of return from the cylinder resting inertia running mode to the normal running mode, the fuel injection to the engine can be resumed to make a return to the normal running mode for performing reacceleration.

A method of controlling the return is different between the case of return from the neutral inertia running mode to the normal running mode and the case of return from the cylinder resting inertia running mode to the normal running mode and, in the case of return from the neutral inertia running mode to the normal running mode, the engine rotation speed must be raised to synchronize the clutch before connecting the clutch, resulting in deterioration in response (responsiveness) as compared to the case of return from the cylinder resting inertia running mode. On the other hand, in the case of return from the cylinder resting inertia running mode to the normal running mode, the engine and the wheels are already coupled before the return and, therefore, the vibration of the engine generated at the time of return is transmitted to the wheels and tends to generate a shock.

The present invention was conceived in view of the situations and it is therefore an object of the present invention to provide a running control device of a vehicle capable of performing a neutral inertia running mode and a cylinder resting inertia running mode and capable of satisfying both reacceleration performance and suppression of shock generated at the time of return when a return is made from these types of inertia running modes to the normal running mode.

Means for Solving the Problem

To achieve the object, the first aspect of the invention provides a running control device of a vehicle including (a) an engine with a plurality of cylinders, a clutch connecting/disconnecting a power transmission path between the engine and wheels, and a variable mechanism being configured to vary an intake air amount sucked into the cylinders of the engine, the running control device of a vehicle performing (b) a normal running mode performed by transmitting a drive force of the engine to the wheels, (c) a neutral inertia running mode performed by disconnecting the power transmission path between the engine and the wheels, and (d) a cylinder resting inertia running mode performed by resting at least a part of the cylinders of the engine while the power transmission path between the engine and the wheels is connected, (e) the running control device of a vehicle making the intake air amount sucked into the cylinders larger at the time of return from the neutral inertia running mode to the normal running mode as compared to the case of return from the cylinder resting inertia running mode to the normal running mode.

Effects of the Invention

Consequently, since the intake air amount becomes larger at the time of return from the neutral inertia running mode to the normal running mode as compared to the return from the cylinder resting inertia running mode, a fresh air amount (air-fuel mixture amount) sucked into the cylinder becomes larger at the time of return from the neutral inertia running mode to the normal running mode as compared to the return from the cylinder resting inertia running mode. Therefore, since the engine rotation speed can promptly be increased as compared to the return from the cylinder resting inertia running mode and the rotation speed difference between the rotating elements of the clutch can be made smaller in a shorter time, the reacceleration performance can be improved when the clutch is connected early for the return to the normal running mode. When the engine rotation speed is increased, the power transmission path between the engine and the wheels is disconnected and, therefore, even if an increase in the fresh air amount sucked into the cylinder makes the combustion pressure in the cylinder higher and makes the engine vibration at the engine start larger, the engine vibration is not transmitted to the wheels and no shock occurs. On the other hand, at the time of return from the cylinder resting inertia running mode to the normal running mode, the fresh air amount sucked into the cylinder at the time of the return is reduced as compared to the return from the neutral inertia running mode and, therefore, the engine vibration associated with the combustion in the engine is made smaller, leading to the suppression of the shock at the time of the return. Since the engine and the wheels are already coupled in the cylinder resting inertia miming mode, a reduction in the engine rotation speed is small and the driver's desired reacceleration performance can be acquired even if the engine rotation speed is not promptly increased. In this way, when a return is made from the inertia running mode to the normal running mode, both the reacceleration performance and the shock suppression at the time of the return can be satisfied.

Preferably, the second aspect of the invention provides the running control device of a vehicle recited in the first aspect of the invention, wherein the variable mechanism is a variable valve mechanism changing at least one of valve-opening timing, a lift amount, and a working angle of an intake valve of the engine. It is conceivable that a throttle opening degree of the engine at the time of return is controlled to increase the engine rotation speed early or to suppress the shock at the time of the return to the normal running mode. For example, it is conceivable that the throttle opening degree of a throttle valve is made larger at the time of return from the neutral inertia running mode as compared to the case of the return from the cylinder resting inertia running mode. However, since fresh air in a space from the throttle valve to the cylinder is sucked into the cylinder at the time of return from the cylinder resting inertia running mode, the shock at the time of the return may not be suppressed even if the throttle opening degree is made smaller. In contrast, the variable valve mechanism can also change the intake amount of the fresh air between the throttle valve and the cylinder and therefore can more accurately satisfy both the reacceleration performance and the shock suppression at the time of the return.

Preferably, the third aspect of the invention provides the running control device of a vehicle recited in the first aspect of the invention, wherein the neutral inertia running mode is performed with the engine put in idle operation or with fuel supply to the engine stopped. Consequently, the fuel consumption amount is reduced and the fuel consumption is improved.

MODE FOR CARRYING OUT THE INVENTION

Preferably, a valve lift amount of an intake valve in this description corresponds to an amount of movement of the valve in an up-down direction. When the valve lift amount becomes larger, an intake air amount sucked into a cylinder of an engine increases.

Preferably, a working angle of the intake valve in this description corresponds to a rotation angle of a crankshaft from opening to closing of the intake valve.

Preferably, an engine brake running mode in this description is performed with fuel supply to an engine basically stopped while a power transmission path between the engine and wheels is connected, and generates an engine brake force from a rotation resistance such as a pumping loss and a friction torque due to driven rotation of the engine. Even in a running state in which a predetermined amount of fuel is supplied to the engine, the engine brake force is generated if the engine is driven to rotate at the time of high vehicle speed etc. Therefore, such a running state is also included in the engine brake running mode.

An example of the present invention will now be described in detail with reference to the drawings. In the following example, the figures are simplified or deformed as needed and portions are not necessarily precisely depicted in terms of dimension ratio, shape, etc.

First Example

Figure 1:
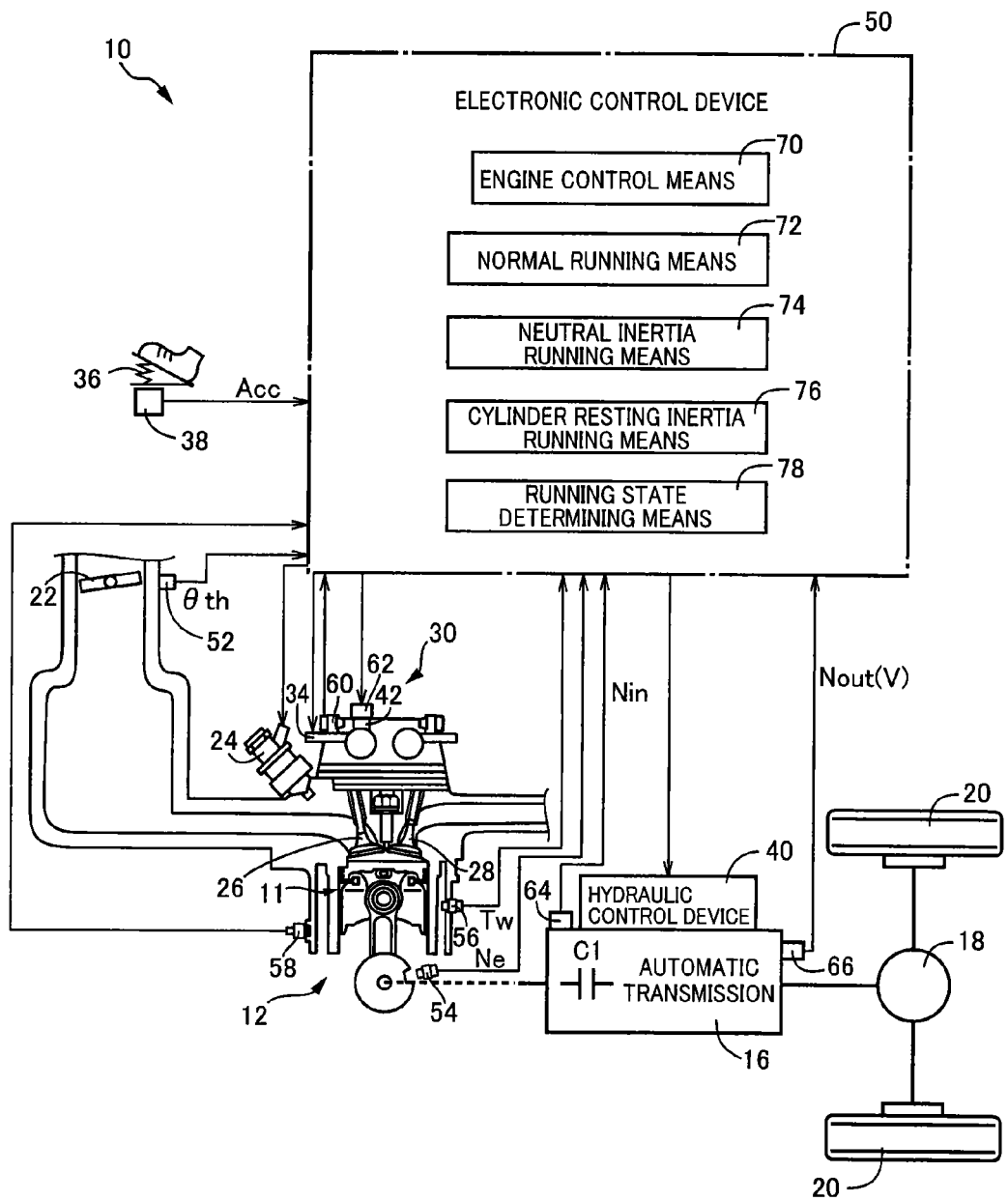
FIG. 1 is a schematic configuration diagram including a schematic of a vehicle drive device to which the present invention is preferably applied along with a main portion of a control system.

FIG. 1 is a schematic configuration diagram including a schematic of a vehicle drive device 10 making up a vehicle to which the present invention is preferably applied along with a main portion of a control system. The vehicle drive device 10 includes as a drive force source an engine 12 that is an internal combustion engine such as a gasoline engine and a diesel engine having a plurality of cylinders 11 generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 includes various pieces of equipment necessary for output control of the engine 12, such as an electronic throttle valve 22 and a fuel injection device 24, as well as a variable valve mechanism 30 adjusting opening/closing timing, a lift amount, and a working angle of an intake valve 26 to achieve a variable intake air amount (air-fuel mixture amount) sucked into a cylinder, and a cylinder resting device 32 resting the intake valve 26 and an exhaust valve 28 (hereinafter simply referred to as intake/exhaust valves if these valves 26 and 28 are not particularly distinguished) in some or all of the cylinders. Although only one of the cylinders 11 is depicted in FIG. 1, the multiple (e.g., eight) cylinders 11 are actually included in this configuration. The variable valve mechanism 30 corresponds to a variable mechanism of the present invention.

The electronic throttle valve 22 controls an intake air amount and the open-close state thereof is adjusted. The electronic throttle valve 22 is basically controlled depending on an accelerator opening degree Acc that is an operation amount of an accelerator pedal 36 corresponding to an output request amount of a driver. The accelerator opening degree Acc is detected by an accelerator opening degree sensor 38.

The fuel injection device 24 injects fuel to an intake port and can electrically control an injection amount depending on a running state. For example, the fuel injection device 24 can stop the fuel supply (perform a fuel cut F/C) at the time of accelerator-off when the accelerator opening degree Acc is zero even during running of the vehicle.

The cylinder resting device 32 can stop the intake/exhaust valves of some or all of the multiple cylinders 11, for example, eight cylinders and, for example, all the intake/exhaust valves are stopped in a closed valve state. As a result, since a pumping loss is reduced when the engine 12 is driven to rotate in the fuel cut state, an engine brake is reduced and a running distance in an inertia running mode can be extended. Pistons may be separated via a clutch etc. from the crankshaft and stopped instead of stopping the intake/exhaust valves. The cylinder resting device 32 is a known technique and, therefore, specific structure and operation thereof will not be described.

Figure 2:
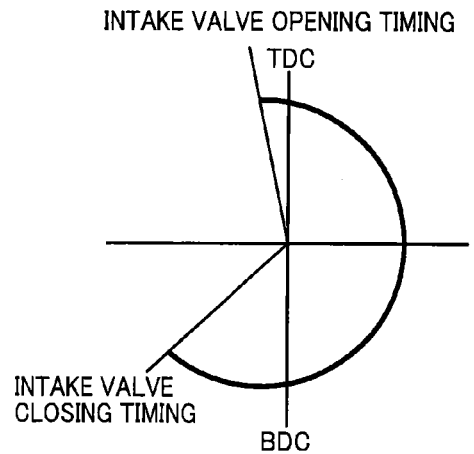
FIG. 2 is a diagram of opening/closing timing of the intake valve during normal operation.
Figure 3:
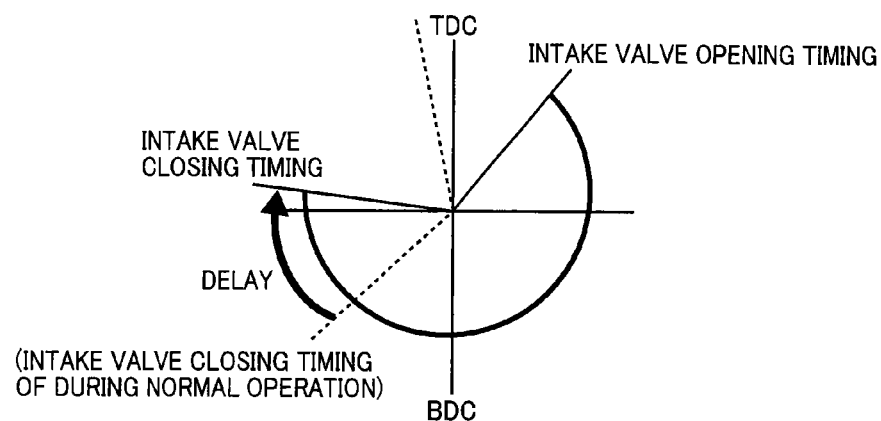
FIG. 3 is a diagram of the opening/closing timing of the intake valve while the intake valve is delayed.
Figure 4:
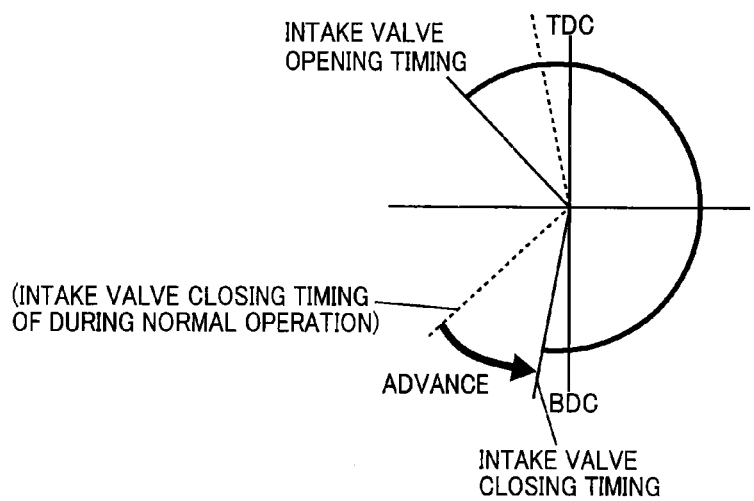
FIG. 4 is a diagram of the opening/closing timing of the intake valve while the intake valve is advanced.

The variable valve mechanism 30 variably controls the opening/closing timing, the valve lift amount, and the working angle of the intake valve 26. The variable valve mechanism 30 can change, for example, a rotational phase of an intake cam not depicted regulating the opening/closing timing of the intake valve 26 by using an intake valve phase actuator 34 depicted in FIG. 1, thereby changing the opening/closing timing of the intake valve 26. FIGS. 2 to 4 are diagrams depicting that the opening/closing timing of the intake valve 26 is adjusted by the variable valve mechanism 30. In FIGS. 2 to 4, an uppermost position corresponds to a piston top dead center (TDC) and a lowermost position corresponds to a piston bottom dead center (BDC).

FIG. 2 depicts a state of the intake valve 26 during normal operation. During the normal operation depicted in FIG. 2, the intake valve 26 is opened immediately before the piston reaches the top dead center and the intake valve 26 is closed when the piston advances by a predetermined angle after passing through the bottom dead center.

FIG. 3 depicts a state of the intake valve 26 changed by a predetermined angle to the delay side by the variable valve mechanism 30. As depicted in FIG. 3, the intake valve 26 is delayed (changed to the delay side) by the predetermined angle and, therefore, the opening timing of the intake valve 26 is delayed as compared to during the normal operation so that the intake valve 26 is opened after the piston passes through the top dead center. The closing timing of the intake valve 26 is also delayed by a predetermined angle as compared to during the normal operation. If the intake valve 26 is changed to the delay side, the opening timing of the intake valve 26 is delayed as described above and, therefore, an intake amount of intake air into the cylinder is reduced.

FIG. 4 depicts a state of the intake valve 26 changed by a predetermined angle to the advance side by the variable valve mechanism 30. As depicted in FIG. 4, the intake valve 26 is advanced (changed to the advance side) by the predetermined angle and, therefore, the opening timing of the intake valve 26 is advanced as compared to during the normal operation. The closing timing of the intake valve 26 is also advanced by a predetermined angle as compared to during the normal operation. If the intake valve 26 is changed to the advance side, the opening timing of the intake valve 26 is advanced as described above and, therefore, an intake amount of intake air into the cylinder is increased.

The variable valve mechanism 30 can change an initial position of a swing arm not depicted having a cam surface swinging the intake valve 26 by using, for example, a lift actuator 42 depicted in FIG. 1, to continuously change the range of use of the cam surface, thereby changing the lift amount of the intake valve 26. Similarly, the variable valve mechanism 30 can change the range of use of the cam surface to change the working angle of the intake valve 26.

Figure 5:
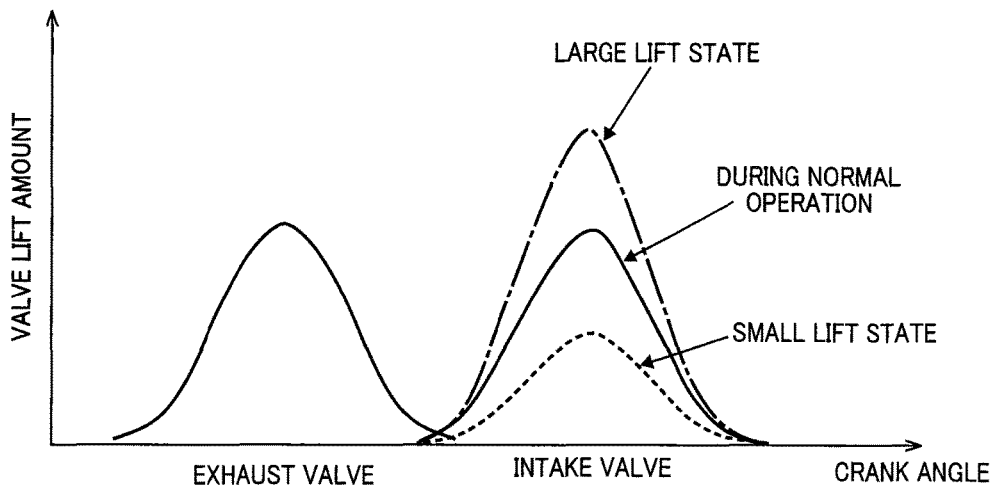
FIG. 5 depicts a relationship between a crank angle of a crankshaft of the engine and a valve lift amount of intake/exhaust valves.

FIG. 5 depicts a relationship between a crank angle of the crankshaft of the engine 12 and a valve lift amount of the intake/exhaust valves. The horizontal and vertical axes indicate the crank angle and the valve lift amount of the intake/exhaust valves, respectively, and the valve lift amount of zero indicates that a valve is closed. As depicted in FIG. 5, the intake valve 26 is opened immediately before closing of the exhaust valve 28 to suck an air-fuel mixture into the cylinder. A solid line indicates the lift amount of the intake valve 26 during the normal operation, and a broken line indicates a state of the valve lift amount of the intake valve 26 made smaller as compared to during the normal operation (a small lift state) while a dashed-dotted line indicates a state of the valve lift amount of the intake valve 26 made larger as compared to during the normal operation (a large lift state). The variable valve mechanism 30 can change the magnitude of the valve lift amount of the intake valve 26 in this way. When the valve lift amount of the intake valve 26 becomes larger, an intake amount of intake air into the cylinder increases, and when the valve lift amount of the intake valve 26 becomes smaller, an intake amount of intake air into the cylinder decreases.

Figure 6:
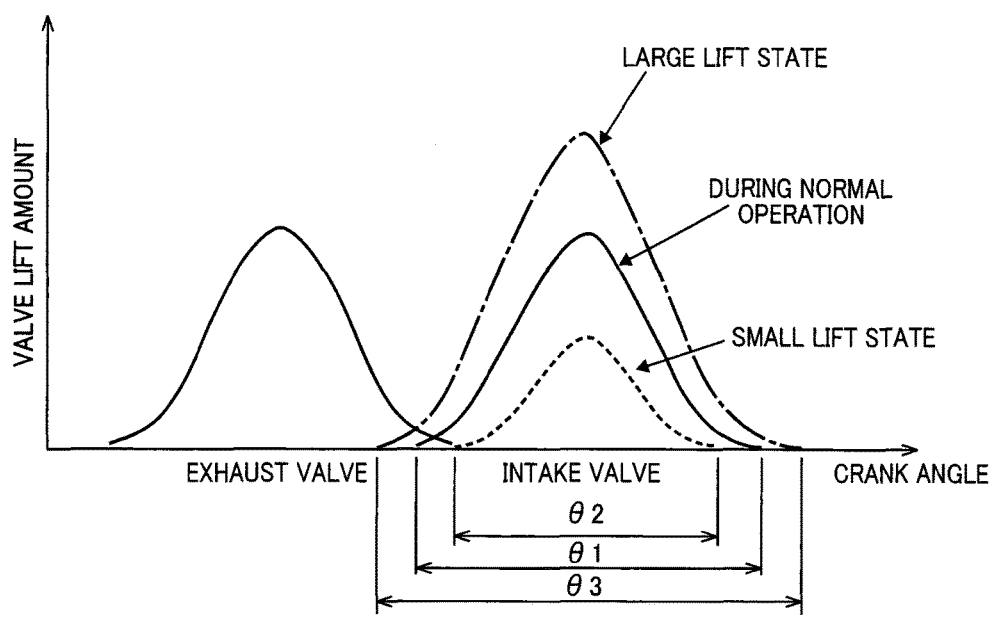
FIG. 6 depicts another relationship between the crank angle of the crankshaft of the engine and the valve lift amount of the intake/exhaust valves.

Similarly to FIG. 5, FIG. 6 depicts a relationship between a crank angle of the crankshaft of the engine 12 and a valve lift amount of the intake/exhaust valves. As depicted in FIG. 6, when the working angle during the normal operation is $\theta1$, a working angle $\theta2$ is made smaller in the state indicated by the broken line than the working angle $\theta1$ during the normal operation. A working angle $\theta3$ is made larger in the state indicated by the dashed-dotted line than the working angle $\theta1$ during the normal operation. The variable valve mechanism 30 can change the working angle $\theta$ of the intake valve 26 in this way. When the working angle of the intake valve 26 becomes larger, an intake amount of intake air into the cylinder increases, and when the working angle of the intake valve 26 becomes smaller, an intake amount of intake air into the cylinder decreases. The variable valve mechanism 30 is a known technique and, therefore, specific structure and operation thereof will not be described.

Returning to FIG. 1, the automatic transmission 16 is a stepped automatic transmission of a planetary gear type etc., having a plurality of gear stages with different gear ratios γ established depending on engaged/released states of a plurality of hydraulic friction engagement devices (clutches and brakes) and is subjected to shift control by electromagnetic hydraulic control valves, switching valves, etc. disposed in a hydraulic control device 40. A clutch C1 acts as an input clutch of the automatic transmission 16 and is also subjected to engagement/release control by the hydraulic control device 40. The clutch C1 corresponds to a connecting/disconnecting device connecting and disconnecting the power transmission path between the engine 12 and the wheels 20. The automatic transmission 16 may be implemented by using a continuously variable transmission of a belt type etc., instead of a stepped transmission. The clutch C1 corresponds to a clutch of the present invention.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 may be made up of a plurality of control devices such as a control device for engine control and a control device for automatic transmission control.

The electronic control device 50 is supplied with a signal indicative of the accelerator opening degree Acc that is an operation amount of the accelerator pedal 36 from an accelerator operation amount sensor 38, a signal indicative of a throttle opening degree θth of the electronic throttle valve 22 from a throttle valve opening degree sensor 52, a signal indicative of a rotation speed Ne (an engine rotation speed Ne) of the engine 12 from an engine rotation speed sensor 54, a signal indicative of an engine water temperature Tw from an engine water temperature sensor 56, a signal indicative of occurrence of knocking from a knocking sensor 58, a signal indicative of a phase of the intake valve 26 from an intake valve phase sensor 60, a signal indicative of a valve lift amount of the intake valve 26 from an intake valve lift sensor 62, a signal indicative of a rotation speed Nin (an input shaft rotation speed Nin) of an input shaft of the automatic transmission 16 from an input shaft rotation speed sensor 64, a signal indicative of a rotation speed Nout (an output shaft rotation speed Nout) of an output shaft of the automatic transmission 16 corresponding to a vehicle speed V from an output shaft rotation speed sensor 66, etc. Other various pieces of information necessary for various controls are also supplied.

The electronic control device 50 functionally includes an engine control means 70, a normal running means 72, a neutral inertia running means 74, a cylinder resting inertia running means 76, and a running state determining means 78. The engine control means 70 sequentially determines a target engine operating point at which a target engine output Pe* calculated from the accelerator opening degree Acc and the vehicle speed V is acquired on an optimum fuel consumption line set in advance, and sequentially determines the engine rotation speed Ne and the engine torque Te indicated by the target engine operating point as a target engine rotation speed Ne* and a target engine torque Te*, respectively. The engine control means 70 sequentially controls the electronic throttle valve 22, the fuel injection device 24, etc., such that the target engine torque Te* and the target engine rotation speed Ne* are output from the engine 12.

The engine control means 70 controls the variable valve mechanism 30 to adjust the opening/closing timing, the valve lift amount, and the working angle of the intake valve 26 depending on a running state. For example, during high-speed running, the engine control means 70 changes the opening/closing timing of the intake valve 26 to the advance side, the valve lift amount to the increase side (large lift side), and the working angle the an enlargement side. During low-speed running, the engine control means 70 changes the opening/closing timing of the intake valve 26 to the delay side, the valve lift amount to the reduction side (small lift side), and the working angle to the reduction side.

The normal running means 72 transmits the drive force of the engine 12 to the wheels 20 for running. In particular, as described in a running mode correspondence table of FIG. 7, the engine 12 is supplied with fuel and rotationally driven during the normal running mode (hereinafter also referred as "normal running") and the clutch C1 connecting/disconnecting the power transmission path between the engine 12 and the wheels 20 is put into an engaged state. Therefore, the torque of the engine 12 is transmitted via the clutch C1 etc. to the wheels 20.

The neutral inertia running means 74 performs the neutral inertia running mode (hereinafter also referred as "neutral inertia running") in a running state in which an inertia running mode can be executed, the accelerator opening degree Acc is equal to or less than a predetermined value while the vehicle speed V is equal to or greater than a predetermined value. In the neutral inertia running mode, as described in the correspondence table of FIG. 7, the inertia running mode is performed by releasing the clutch C1 to separate the engine 12 from the wheels 20 while the engine 12 is supplied with fuel and operated in an idle operation state (an idling state). In this case, since the engine brake force becomes smaller than that of the conventional engine brake running mode (hereinafter also referred as "engine brake running") and the release of the clutch C1 results in the engine brake force of substantially zero, a reduction in running resistance extends the running distance in the inertia running mode, and fuel consumption can be improved. Although fuel is consumed by operating the engine 12 in the idle operation state, since the distance in the inertia running mode becomes longer as compared to the engine brake running mode, a frequency of reacceleration is reduced and overall fuel consumption is improved. Although the engine 12 is put in the idle operation during the neutral inertia running mode in this example, the fuel supply to the engine 12 may be stopped to stop the rotation of the engine 12. Therefore, the neutral inertia running mode of the present invention includes not only the form of putting the engine 12 into the idle operation but also the form of stopping the fuel supply to the engine 12 to stop the rotation of the engine 12.

The cylinder resting inertia running means 76 performs the cylinder resting inertia running mode (hereinafter also referred as "cylinder resting inertia running") in the running state in which the inertia running mode can be executed. In the cylinder resting inertia running mode, as described in the correspondence table of FIG. 7, while the engaged state of the clutch C1 is maintained to couple the engine 12 and the wheels 20, the fuel supply to the engine 12 is stopped (the fuel cut F/C is performed) and the cylinder resting device 32 stops the intake/exhaust valves in some (e.g., half) of the multiple cylinders all at the positions where the valves are in the closed valve state. In this case, since the intake/exhaust valves are stopped in some of the cylinders 11 in the closed valve state although the crankshaft is driven to rotate depending on the vehicle speed V and the gear stage of the automatic transmission 16, a loss due to a pumping action (a pumping loss) becomes smaller as compared to the case of opening/closing of the intake/exhaust valves in synchronization with the crankshaft, and the engine brake force is reduced as compared to the engine brake running mode. As a result, the running distance in the inertia running mode is extended and the fuel consumption is improved. Therefore, although the engine brake force is larger as compared to the neutral inertia running mode and the running distance in the inertia running mode becomes relatively short, since the engine 12 is subjected to the fuel cut and simply driven to rotate, the efficiency of fuel consumption is on the same level with, or equal to or greater than, the neutral inertia running mode.

As described above, the neutral inertia running mode including the engine brake running mode and the cylinder resting inertia running mode are selectively performed in the inertia running state. The running modes are appropriately switched, for example, in accordance with a preset inertia running mode map during the inertia running mode or by a running mode selection switch disposed on a driver's seat and switchable by a driver.

The running state determining means 78 determines whether the running state of the vehicle is the inertia running mode and, if the running state is the inertia running mode, determines which of the inertia running modes the inertia running is performed in. The inertia running mode is determined based on whether the accelerator opening degree Acc is equal to or less than a predetermined value and the vehicle speed V is equal to or greater than a predetermined value, for example. The running mode during the inertia running can be determined based on the operation state of the engine 12 and the engaged state of the clutch C1, for example. The running mode can also be determined by detecting a running mode command signal output from the electronic control device 50.

If a reacceleration request of a driver is output because the accelerator pedal 36 is depressed by the driver while the inertia running mode is performed, a return is made from the inertia running mode to the normal running mode. At the time of return to the normal running mode, a control method thereof is different between the neutral inertia running mode and the cylinder resting inertia running mode. For example, although the clutch C1 must be engaged at the time of return from the neutral inertia running mode to the normal running mode, since the engine 12 is operating in the idle operation, the engine rotation speed Ne is low and a rotation speed difference between rotating elements of the clutch C1 is large. Therefore, the engine rotation speed Ne is increased until the rotation speed difference between the rotating elements of the clutch C1 becomes equal to or less than a predetermined value so that the clutch C1 can be engaged. Subsequently, when the rotation speed difference of the clutch C1 becomes equal to or less than the predetermined value, the clutch C1 is engaged to make a return to the normal running mode. On the other hand, at the time of return from the cylinder resting inertia running mode to the normal running mode, since the clutch C1 is in the engaged state, the rotation speed difference is not generated in the clutch C1. Therefore, a return to the normal running mode is made simply by resuming the combustion in the engine 12. The rotation speed difference between both rotating elements of the clutch C1 can be calculated based on, for example, the input shaft rotation speed Nin detected by the input shaft rotation speed sensor 64, the output shaft rotation speed Nout detected by the output shaft rotation speed sensor 66, and the gear ratio γ of the automatic transmission 16.

In the case of return from the neutral inertia running mode to the normal running mode, the raise of the engine rotation speed Ne and the engagement of the clutch C1 are required, resulting in deterioration in responsiveness (response) to the return as compared to the return of the cylinder resting inertia running mode. On the other hand, in the case of return from the cylinder resting inertia running mode to the normal running mode, since the clutch C1 is already engaged, i.e., the engine 12 is coupled to the wheels 20, the vibration of the engine 12 generated during the return is transmitted to the wheels 20 and tends to generate a shock. Therefore, at the time of return from the inertia running mode to the normal running mode, the engine control means 70 switches the control method of the engine 12 depending on the running mode during the inertia running to satisfy both the reacceleration performance improvement and the shock suppression at the time of the return. A specific method of control by the engine control means 70 will hereinafter be described.

First, a return from the neutral inertia running mode to the normal running mode will be described. Since the clutch C1 is released and the rotation speed difference between the rotating elements of the clutch C1 is large in the neutral inertia running mode as described above, the engine rotation speed Ne must promptly be raised. Therefore, the engine control means 70 uses the variable valve mechanism 30 to control the phase of the intake valve 26 to the advance side at the time of return from the neutral inertia running mode. Alternatively, the engine control means 70 uses the variable valve mechanism 30 to control the valve lift amount of the intake valve 26 to the increase side (large lift side). Alternatively, the engine control means 70 uses the variable valve mechanism 30 to control the working angle of the intake valve 26 to the enlargement side. Provision of at least one of these controls is sufficient and these controls may concurrently be provided.

Since provision of such control leads to prompt intake of the air-fuel mixture (intake air) into the cylinder of the engine 12 and increases the air-fuel mixture amount, a combustion pressure in the cylinder becomes higher and the engine rotation speed Ne is promptly raised. Therefore, the rotation speed difference between the rotating elements of the clutch C1 is promptly made smaller and the clutch C1 is engaged earlier, resulting in an improvement in reacceleration performance at the time of return. The advance amount, the valve lift amount, and the working angle of the intake valve 26 controlled by the variable valve mechanism 30 at the time of return to the normal running mode are obtained in advance from experiments etc., and are set to values such that the engine rotation speed Ne increases at a preset change rate, for example. The advance amount, the valve lift amount, and the working angle may not necessarily be set to constant values and may be changed depending on the vehicle speed V, the engine rotation speed Ne, and the engine water temperature Tw, for example. As a trade-off for promptly raising the engine rotation speed Ne, the combustion pressure in the cylinder of the engine 12 increases and the engine vibration is made larger. However, since the clutch C1 is released while the engine rotation speed Ne is raised, the vibration is not transmitted to the wheels 20. Therefore, no shock occurs at the time of return.

A return from the cylinder resting inertia running mode to the normal running mode will be described. In the cylinder resting inertia running mode, the clutch C1 is engaged as described above. Therefore, when the engine rotation speed Ne is promptly raised, the engine vibration is made larger and transmitted to the wheels 20, resulting in a shock. Therefore, the engine control means 70 uses the variable valve mechanism 30 to control the phase of the intake valve 26 to the delay side at the time of return from the cylinder resting inertia running mode. Alternatively, the engine control means 70 uses the variable valve mechanism 30 to control the valve lift amount of the intake valve 26 to the reduction side (small lift side). Alternatively, the engine control means 70 uses the variable valve mechanism 30 to control the working angle of the intake valve 26 to the reduction side. Provision of at least one of these controls is sufficient and these controls may concurrently be provided.

Since provision of such control leads to a reduction in the air-fuel mixture (intake air) sucked into the cylinder of the engine 12 immediately after a request for return to the normal running mode is made. As a result, an increase in the combustion pressure is restrained at the engine start and, therefore, the engine vibration is suppressed at the engine start. The delay amount, the valve lift amount, and the working angle of the intake valve 26 controlled by the variable valve mechanism 30 at the time of return to the normal running mode are obtained in advance from experiments etc., and are set to values such that the engine rotation speed Ne increases at a preset change rate, for example. This change rate is set to a value smaller than the change rate at the time of return from the neutral inertia running mode. The delay amount, the valve lift amount, and the working angle may not necessarily be set to constant values and may be changed depending on the vehicle speed V, the engine rotation speed Ne, and the engine water temperature Tw, for example. As a trade-off for reducing the air-fuel mixture sucked into the cylinder, the initial rise is delayed in the engine 12; however, since the clutch C1 is engaged and the engine rotation speed Ne is maintained at a rotation speed higher than an idle rotation Nidle in the cylinder resting inertia running mode, a return to the normal running mode is promptly made and the reacceleration performance is maintained.

As described above, the control is provided at the time of return from the neutral inertia running mode to the normal running mode such that the air-fuel mixture (intake air) sucked into the cylinder is increased by the variable valve mechanism 30, and the control is provided at the time of return from the cylinder resting inertia running mode to the normal running mode such that the air-fuel mixture sucked into the cylinder is reduced by the variable valve mechanism 30. Therefore, the air-fuel mixture amount (intake air amount) sucked into the cylinder of the engine 12 can be increased at the time of return from the neutral inertia running mode to the normal running mode as compared to the case of return from the cylinder resting inertia running mode to the normal running mode, thereby satisfying both the reacceleration performance improvement at the time of return and the shock suppression at the time of the return.

Figures 7, 8:
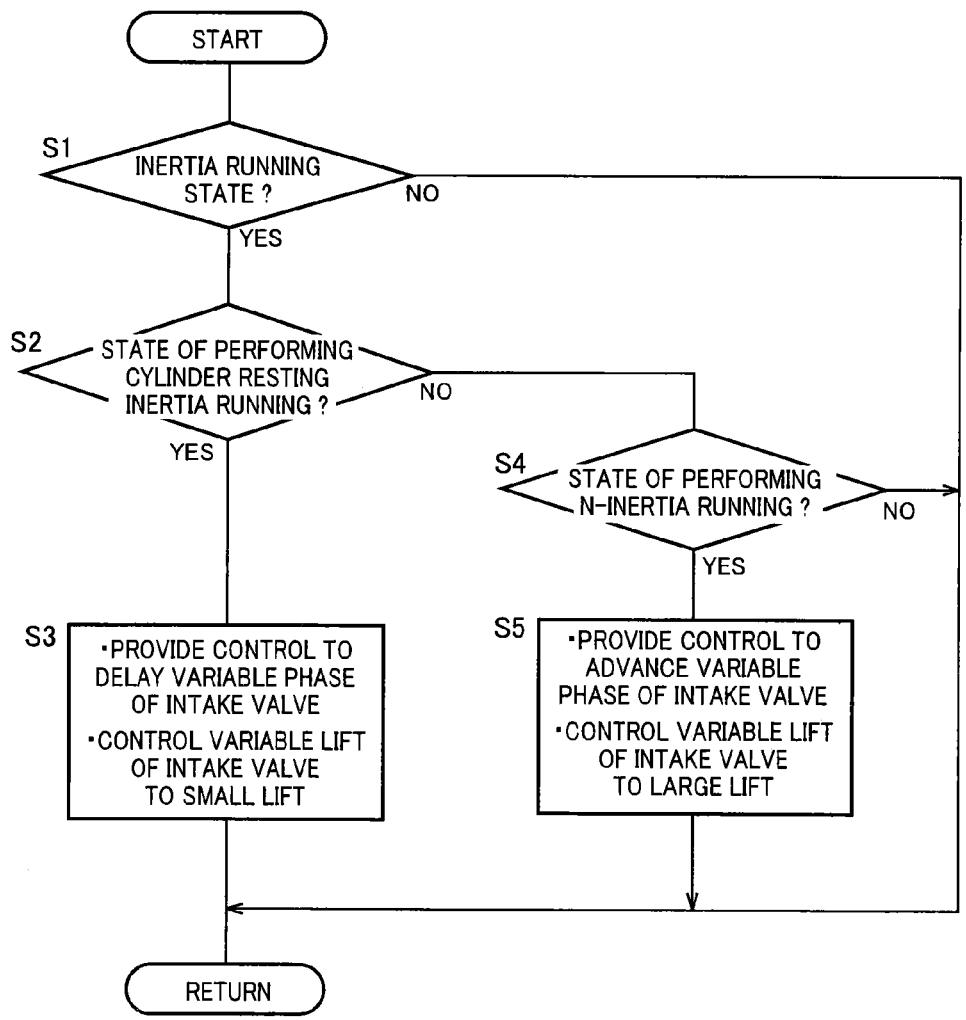
FIG. 7 is a table for explaining three running modes performed by the vehicle drive device depicted in FIG. 1.
FIG. 8 is a flowchart for explaining the control operation capable of satisfying both the reacceleration performance and the shock suppression at the time of return when a return to the normal running mode is made during the inertia running mode.

FIG. 8 is a flowchart for explaining a main portion of the control operation of the electronic control device 50, i.e., the control operation capable of satisfying both the reacceleration performance and the shock suppression at the time of return when a return to the normal running mode is made during the inertia running mode, and is repeatedly executed with an extremely short cycle time, for example, on the order of a few msec to a few tens of msec. The flow is based on the assumption that a command for switching from the inertia running mode to the normal running mode is output because the accelerator pedal 36 is depressed during the inertia running mode.

First, at step S1 corresponding to the running state determining means 78, it is determined whether the current running state is the inertia running state. If the step S1 is negative, this routine is terminated. If the step S1 is affirmative, at step S2 corresponding to the running state determining means 78, it is determined whether the inertia running mode is the cylinder resting inertia running mode. If the step S2 is affirmative, at S3 corresponding to the engine control means 70, the phase of the intake valve 26 of the engine 12 is controlled to the delay side at the time of return from the cylinder resting inertia running mode to the normal running mode. Alternatively, the valve lift amount of the intake valve 26 is controlled to the reduction side (small lift side). Provision of such control restrains the engine vibration at the engine start and the shock is suppressed.

Returning to the step S2, if the step S2 is negative, at step S4 corresponding to the running state determining means 78, it is determined whether the inertia running mode is the neutral inertia running mode. If the step S4 is negative, this routine is terminated. If the step S4 is affirmative, at step S5 corresponding to the engine control means 70, the phase of the intake valve 26 of the engine 12 is controlled to the advance side at the time of return from the neutral inertia running mode to the normal running mode. Alternatively, the valve lift amount of the intake valve 26 is controlled to the increase side (large lift side). Since provision of such control promptly raises the engine rotation speed Ne to the rotation speed at which the clutch C1 can be engaged, the clutch C1 is promptly engaged and the reacceleration performance at the time of the return is improved.

Figure 9:
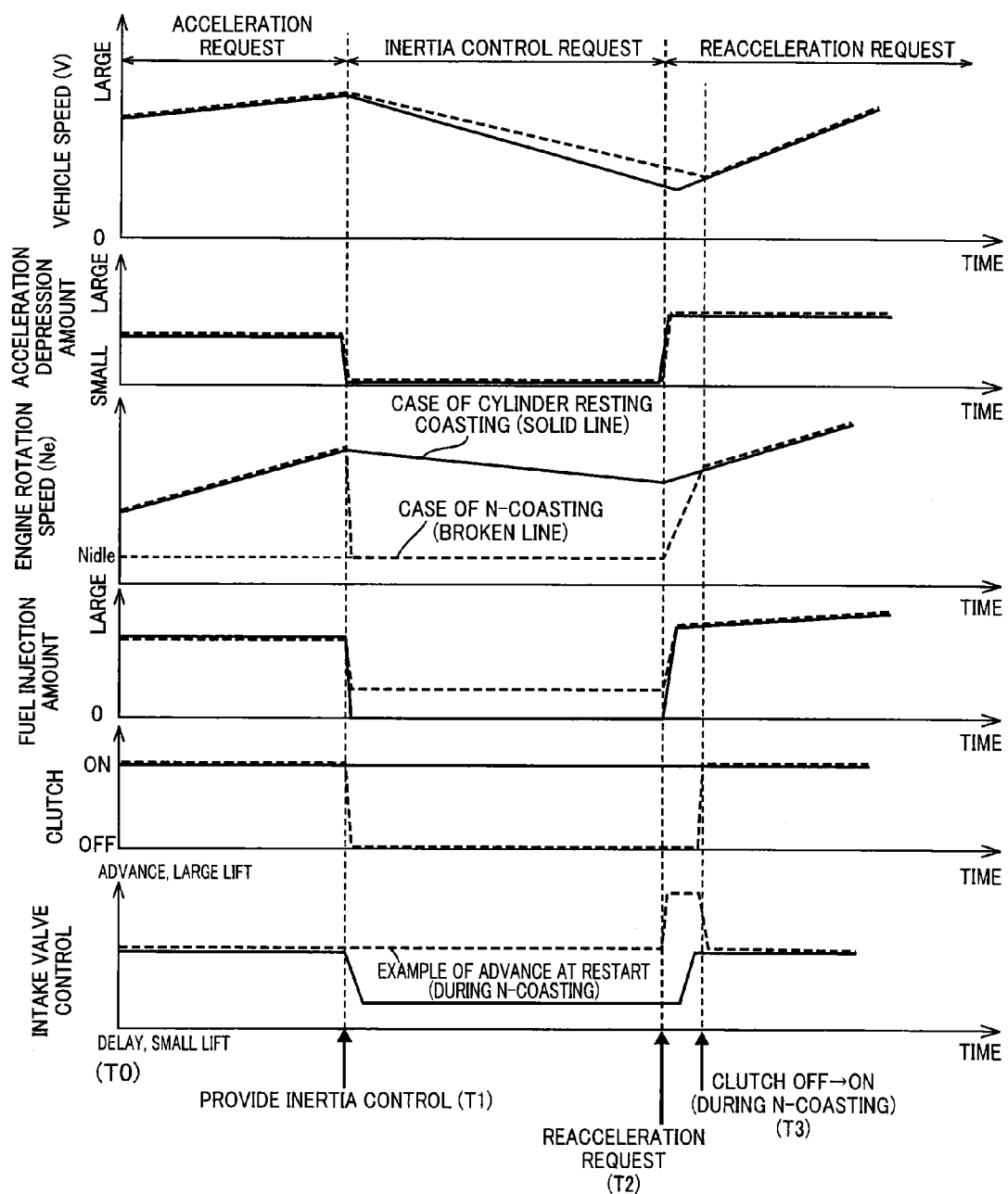
FIG. 9 is a time chart for explaining an operation state from the control operation of an electronic control device.

FIG. 9 is a time chart for explaining the operation state from the control operation of the electronic control device 50 and specifically depicts the operation state at the time of switching in order of the acceleration running mode (hereinafter also referred as "acceleration running"), the inertia running mode, and the reacceleration running mode (hereinafter also referred as "reacceleration running"). In FIG. 9, the horizontal axes indicate time and the vertical axes indicate the vehicle speed V, an accelerator depression amount corresponding to the accelerator opening degree Acc, the engine rotation speed Ne, a fuel injection amount, the engaged state of the clutch C1, and the state of the intake valve 26, from top to bottom. A solid line corresponds to the control during the cylinder resting inertia running mode (during cylinder resting coasting) and a broken line corresponds to the control during the neutral inertia running mode (during N-coasting). In FIG. 9, during the acceleration running from time T0 to time T1, the fuel injection amount is controlled depending on the accelerator depression amount, and the engine rotation speed Ne and the vehicle speed V are increased. When the depression of the accelerator pedal 36 is released at time T1, the acceleration running is switched to the inertia running mode.

In the case of the cylinder resting inertia running mode indicated by the solid lines, the fuel supply is completely stopped during the inertia running mode (from time T1 to time T2) and the engaged state of the clutch C1 is maintained. In this case, since some of the intake/exhaust valves of the cylinders 11 are put into the closed valve state, the pumping loss is reduced and the deceleration is made smaller as compared to during the engine brake running mode. Therefore, the vehicle speed V gently decreases as compared to during the engine brake running mode not depicted. The engine rotation speed Ne also gently decreases. In the cylinder resting inertia running mode, the intake valve 26 is controlled to the delay side or the small lift side. This is because, since the engine 12 is started with the intake valve 26 changed to the delay side or the small lift side when the reacceleration request described later is output, the change is made in advance during the inertia running mode to further reduce a delay.

In the case of the neutral inertia running mode indicated by the broken lines, the clutch C1 is released during the inertia running mode and the fuel injection amount is controlled such that the engine rotation speed Ne is set to the idle rotation speed Nidle. Since the clutch C1 is released, the engine rotation speed Ne promptly decreases to the idle rotation speed Nidle. In this case, since the release of the clutch C1 results in the engine brake force of substantially zero, the deceleration of the vehicle further decreases as compared to the cylinder resting inertia running mode. Therefore, as indicated by the broken line, the decrease in the vehicle speed V becomes gentler as compared to the cylinder resting inertia running mode indicated by the solid line.

At time T2, when the accelerator pedal 36 is depressed again and the reacceleration request is output, the return to the normal running mode is started. The return from the cylinder resting inertia running mode indicated by the solid line will first be described. At time T2, the fuel injection is resumed and the engine start is resumed. In this case, since the intake valve 26 of the engine 12 is controlled in advance to the delay side or the small lift side, the air-fuel mixture sucked into the cylinder of engine 12 is reduced. Therefore, the engine vibration at the engine start is suppressed. Although the engine rotation speed Ne gently increases, since the engine rotation speed Ne is a rotation speed higher than the idle rotation speed Nidle and the clutch C1 is already engaged, the reacceleration performance is maintained.

The return from the neutral inertia running mode indicated by the broken line will then be described. At time T2, when the engine rotation speed Ne starts being raised for returning to the normal running mode, the intake valve 26 is controlled to the advance side or the large lift side. As a result, the air-fuel mixture is promptly sucked into the cylinder of the engine 12 and the engine rotation speed Ne promptly increases as indicated by the broken line. When the engine rotation speed Ne promptly increases in this way, the combustion pressure in the cylinder is made higher and, therefore, the engine vibration becomes larger; however, since the clutch C1 is in the released state, no shock occurs due to the vibration. When it is determined at time T3 that the rotation speed difference between both rotating elements of the clutch C1 becomes equal to or less than the predetermined value, the clutch C1 is engaged for the return to the normal running mode. Although the clutch C1 must be engaged for the return from the neutral inertia running mode as described above, the engine rotation speed Ne promptly increases as compared to the return from the cylinder resting inertia running mode and, therefore, the high reacceleration performance is maintained.

As described above, according to this example, since the intake air amount becomes larger at the time of return from the neutral inertia running mode to the normal running mode as compared to the return from the cylinder resting inertia running mode, the air-fuel mixture amount (intake air amount) sucked into the cylinder becomes larger at the time of return from the neutral inertia running mode to the normal running mode as compared to the return form the cylinder resting inertia running mode. Therefore, since the engine rotation speed Ne can promptly be increased as compared to the return from the cylinder resting inertia running mode and the rotation speed difference between the rotating elements of the clutch C1 can be made smaller in a shorter time, the reacceleration performance can be improved when the clutch C1 is connected early for the return to the normal running mode. When the engine rotation speed Ne is increased, the power transmission path between the engine 12 and the wheels 20 is disconnected and, therefore, even if an increase in the air-fuel mixture sucked into the cylinder makes the combustion pressure in the cylinder higher and makes the engine vibration at the engine start larger, the engine vibration is not transmitted to the wheels 20 and no shock occurs. On the other hand, at the time of return from the cylinder resting inertia running mode to the normal running mode, the air-fuel mixture amount sucked into the cylinder at the time of the return is reduced as compared to the return from the neutral inertia running mode and, therefore, the engine vibration associated with the combustion in the engine 12 is made smaller, leading to the suppression of the shock at the time of the return. Since the engine 12 and the wheels 20 are already coupled in the cylinder resting inertia running mode, a reduction in the engine rotation speed Ne is small and the driver's desired reacceleration performance can be acquired even if the engine rotation speed Ne is not promptly increased. In this way, when a return is made from the inertia running mode to the normal running mode, both the reacceleration performance and the shock suppression at the time of the return can be satisfied.

According to this example, it is conceivable that the throttle opening degree of the engine 12 at the time of return is controlled to increase the engine rotation speed Ne early or to suppress the shock at the time of the return to the normal running mode. However, since fresh air in a space from the electronic throttle valve 22 to the cylinder 11 is sucked into the cylinder at the time of return from the cylinder resting inertia running mode, the shock at the time of the return may not be suppressed even if the throttle opening degree θth is made smaller. In contrast, the variable valve mechanism 30 can also change the intake amount of the fresh air between the electronic throttle valve 22 and the cylinder 11 and therefore can more accurately satisfy both the reacceleration performance and the shock suppression at the time of the return.

According to this example, since the neutral inertia running mode is performed with the engine 12 in the idle operation or with the fuel supply to the engine 12 stopped, the fuel consumption amount is reduced and the fuel consumption is improved.

Another example of the present invention will be described. In the following description, the portions common to the examples are denoted by the same reference numerals and will not be described.

Second Example

In the example described above, at the time of return from the neutral inertia running mode to the normal running mode, the phase of the intake valve 26 is controlled to the advance side or the valve lift amount of the intake valve 26 is controlled to the increase side (large lift side) by the variable valve mechanism 30 to increase the air-fuel mixture amount and, at the time of return from the cylinder resting inertia running mode to the normal running mode, the phase of the intake valve 26 is controlled to the delay side or the valve lift amount of the intake valve 26 is controlled to the reduction side (small lift side). In contrast, as in this example, the variable valve mechanism 30 may be controlled to increase the air-fuel mixture amount (intake air amount) even at the time of return from the cylinder resting inertia running mode to the normal running mode and, the variable valve mechanism 30 may be controlled to more significantly increase the air-fuel mixture amount (intake air amount) at the time of return from the neutral inertia running mode to the normal running mode.

At the time of return from the cylinder resting inertia running mode to the normal running mode, the engine control means 70 of this example uses the variable valve mechanism 30 to control the phase of the intake valve 26 to the advance side as compared to during the normal operation. Alternatively, the engine control means 70 uses the variable valve mechanism 30 to control the valve lift amount of the intake valve 26 to the increase side as compared to during the normal operation. At the time of return from the neutral inertia running mode to the normal running mode, the engine control means 70 uses the variable valve mechanism 30 to control the phase of the intake valve 26 more significantly to the advance side as compared to during the normal operation. Alternatively, the engine control means 70 uses the variable valve mechanism 30 to control the valve lift amount of the intake valve 26 more significantly to the increase side as compared to during the normal operation. In other words, the advance amount and the valve lift amount of the intake valve 26 at the time of return from the neutral inertia running mode to the normal running mode are set to values larger than the advance amount and the valve lift amount at the time of return from the cylinder resting inertia running mode to the normal running mode. Therefore, although the air-fuel mixture amount (intake air amount) increases even in the case of return from the cylinder resting inertia running mode to the normal running mode in this example, the air-fuel mixture amount (intake air amount) more significantly increases at the time of return from the neutral inertia running mode to the normal running mode as compared to the return from the cylinder resting inertia running mode.

Even if the control is provided as described above, the same effect as the example can be acquired. Since the phase of the intake valve 26 is controlled to the advance side or the valve lift amount of the intake valve 26 is controlled to the increase side by the variable valve mechanism 30 even in the case of return from the cylinder resting inertia running mode to the normal running mode in this example, the engine rotation speed Ne is relatively promptly raised and the return to the normal running mode is promptly made. Since the combustion pressure does not significantly increase and the engine rotation speed Ne is in a relatively high state in the cylinder resting inertia running mode, a change amount of the engine rotation speed Ne is relatively small at the time of return to the normal running mode and, therefore, the shock is less problematic. In the case of return from the neutral inertia running mode to the normal running mode, the phase of the intake valve 26 is controlled to the advance side as compared to the return from the cylinder resting inertia running mode or the valve lift amount of the intake valve 26 is controlled to the increase side as compared to the return from the cylinder resting inertia running mode by the variable valve mechanism 30 and, therefore, the air-fuel mixture amount more significantly increases as compared to the return from the cylinder resting inertia running mode. As a result, the engine rotation speed Ne rapidly increases and the clutch C1 can promptly be engaged to make the return to the normal running mode. Since the clutch C1 is released during the increase in the engine rotation speed Ne, the vibration generated during the increase is not transmitted to the wheels 20.

Figure 10:
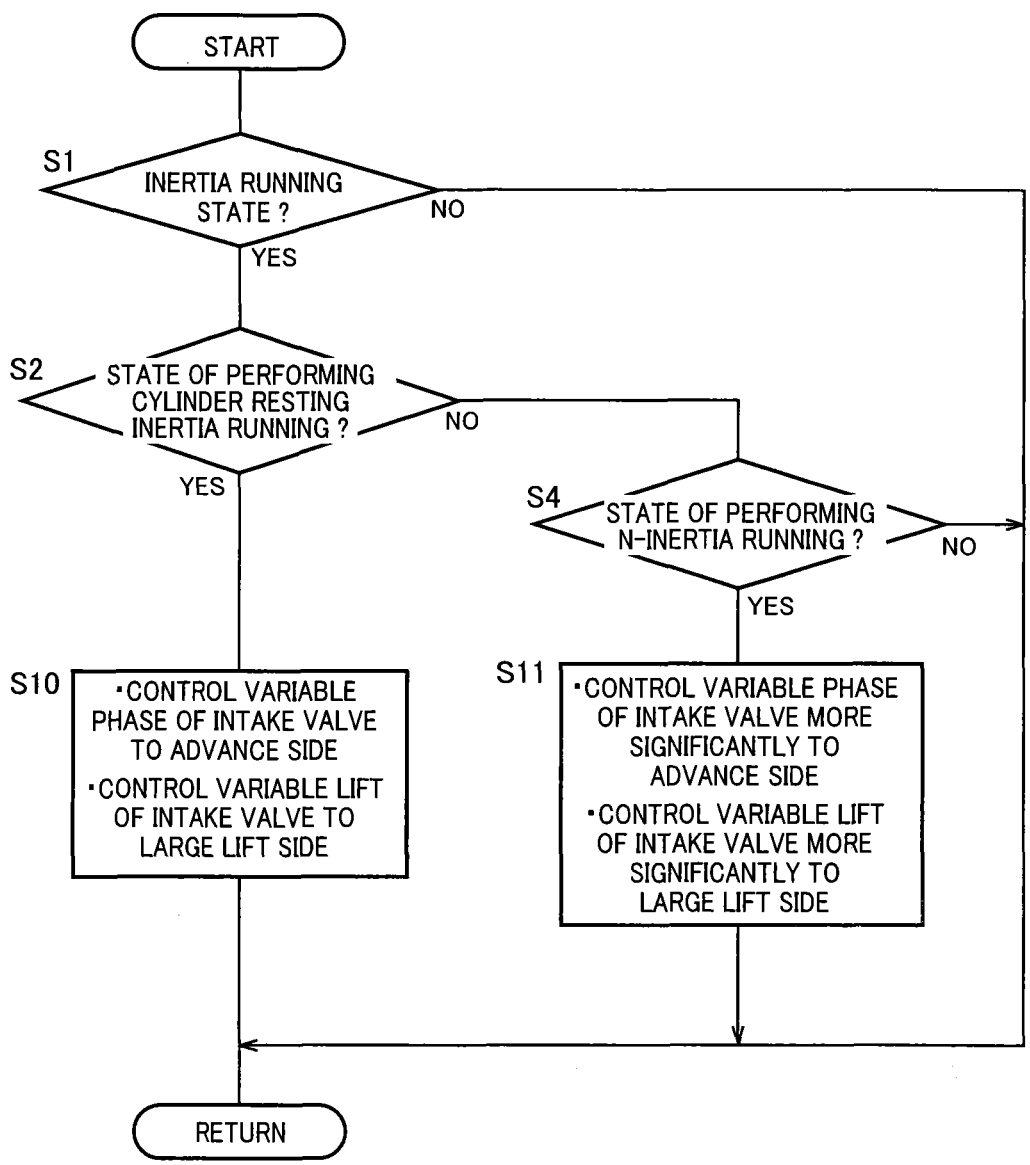
FIG. 10 is another flowchart for explaining the control operation capable of satisfying both the reacceleration performance and the shock suppression at the time of return when a return to the normal running mode is made during the inertia running mode.

FIG. 10 is a flowchart for explaining a main portion of the control operation of the electronic control device 50 of this example, i.e., the control operation capable of satisfying both the reacceleration performance and the shock suppression at the time of the return when a return to the normal running mode is made during the inertia running mode. Comparing the flowchart of FIG. 10 with the flowchart (FIG. 8) of the example described above, the step S3 is changed to step S10 and the step S5 is changed to step S11. Only the steps S10 and S11 different from the example will be described.

In the flowchart of FIG. 10, if the step S2 is affirmative, the step S10 corresponding to the engine control means 70 is executed. At the step S10, the phase of the intake valve 26 is controlled to the advance side at the time of return from the cylinder resting inertia running mode to the normal running mode. Alternatively, the valve lift amount of the intake valve 26 is controlled to the increase side. When such control is provided, the engine rotation speed Ne is relatively promptly raised and the reacceleration performance is further improved.

If the step S4 is affirmative, the step S11 corresponding to the engine control means 70 is executed. At the step S11, the phase of the intake valve 26 is controlled more significantly to the advance side at the time of return from the neutral inertia running mode to the normal running mode. Alternatively, the valve lift amount of the intake valve 26 is controlled more significantly to the increase side (large lift side). Specifically, the control is provided such that the advance amount and the valve lift amount of the intake valve become significantly larger at the time of return from the neutral inertia running mode to the normal running mode as compared to the case of return from the cylinder resting inertia running mode to the normal running mode. As a result, the air-fuel mixture amount (intake air amount) becomes larger at the time of return from the neutral inertia running mode as compared to the return from the cylinder resting inertia running mode and the engine rotation speed Ne is promptly raised. Therefore, the clutch C1 can promptly be engaged to promptly make the return to the normal running mode and the reacceleration performance becomes favorable.

Figure 11:
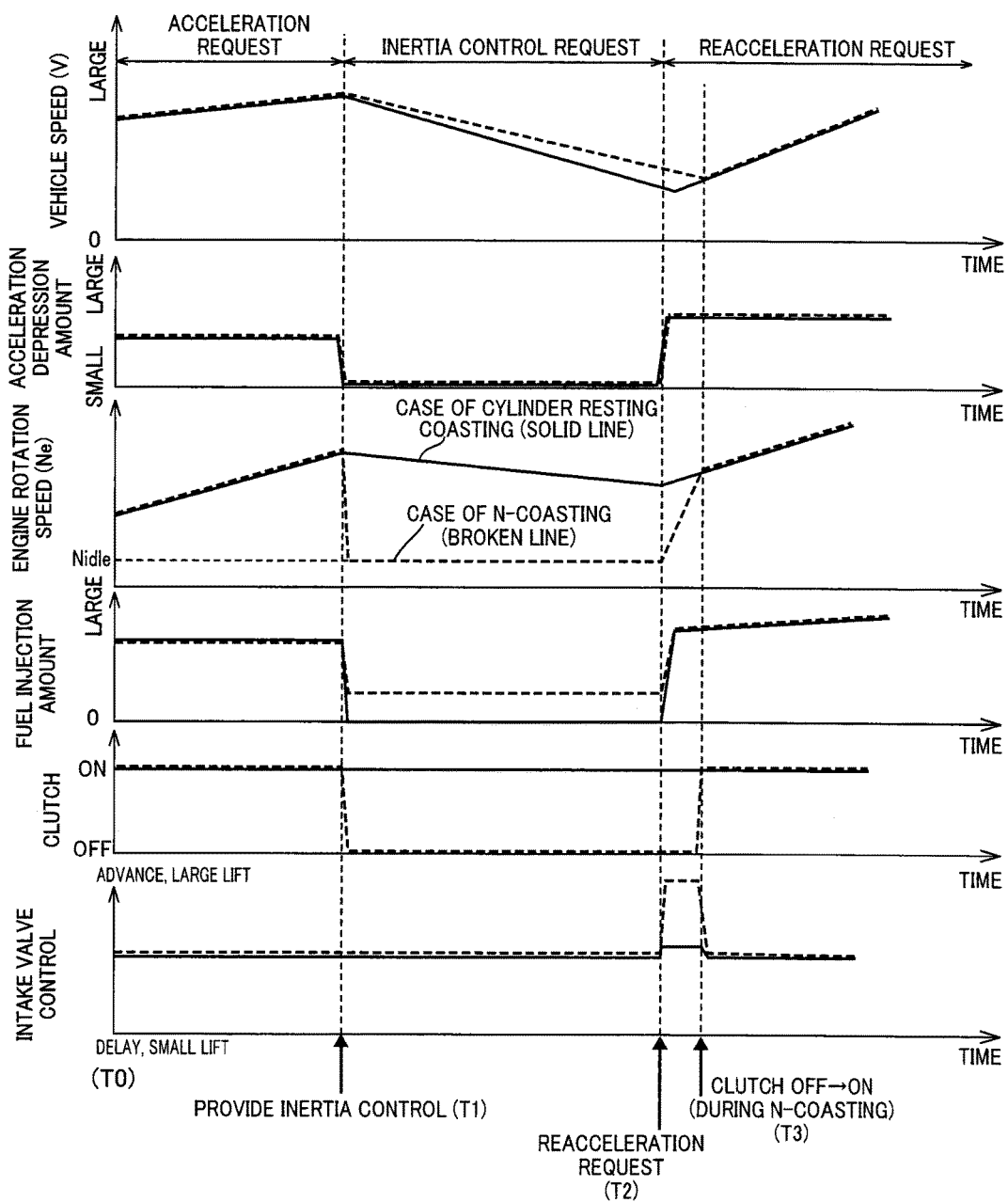
FIG. 11 is another time chart for explaining the operation state from the control operation of the electronic control device.

FIG. 11 is a time chart for explaining the operation state from the control operation of the electronic control device 50 of this example. In this example, at time T2 when the accelerator pedal 36 is depressed and a reacceleration request is output, the intake valve 26 of the engine 12 is controlled to the advance side or the large lift side in the case of return from the cylinder resting inertia running mode indicated by the solid line. As a result, the engine 12 is relatively promptly started. In the case of return from the neutral inertia running mode indicated by the broken line, the intake valve 26 of the engine 12 is controlled more significantly to the advance side even as compared to the return from the cylinder resting inertia running mode. Alternatively, the intake valve 26 of the engine 12 is controlled more significantly to the large lift side even as compared to the return from the cylinder resting inertia running mode. As a result, the air-fuel mixture amount (intake air amount) sucked into the cylinder of the engine 12 more significantly increases and the engine rotation speed Ne is promptly raised, resulting in the prompt engagement of the clutch C1 at time T3. Therefore, the return to the normal running mode can promptly be made to acquire the high reacceleration performance. Since the clutch C1 is released during the increase in the engine rotation speed Ne, the vibration generated during the increase is not transmitted to the wheels 20.

Even if the control is provided as in this example such that the air-fuel mixture amount is increased at the time of return from the cylinder resting inertia running mode to the normal running mode while the air-fuel mixture amount is more significantly increased at the time of return from the neutral inertia running mode to the normal running mode, the air-fuel mixture amount (intake air amount) sucked into the cylinder becomes larger at the time of return from the neutral inertia running mode to the normal running mode as compared to the case of return from the cylinder resting inertia running mode to the normal running mode and, therefore, substantially the same effect as the example described above can be acquired.

Although the examples of the present invention have been described in detail with reference to the drawings, the present invention is also applied in other forms.

For example, although the clutch C1 connecting/disconnecting the power transmission path between the engine 12 and the wheels 20 is one of the clutches of the automatic transmission 16 including pluralities of clutches and brakes and switchable to neutral in the examples, the clutch C1 is not limited to the automatic transmission 16 and is not particularly limited as long as the clutch connects and disconnects the power transmission path between the engine 12 and the wheels 20. The clutch is not limited to a hydraulic friction engagement device and can be implemented by using various connecting/disconnecting devices such as an electromagnetic clutch, for example.

Although the engine 12 is put in the idle operation during the neutral inertia running mode in the first example, the fuel supply to the engine 12 may be stopped to stop the engine 12.

Although the variable valve mechanism 30 is used as a mechanism adjusting the intake air amount into the cylinder of the engine 12 in the examples, the intake air amount may be adjusted by the electronic throttle valve 22. However, the electronic throttle valve 22 is located away from the cylinders of the engine 12 as compared to the variable valve mechanism 30 and therefore has lower responsiveness. Thus, the variable valve mechanism 30 is more preferable in consideration of the responsiveness of the engine 12.

Although it is determined at the time of return from the inertia running mode to the normal running mode whether the running state is the inertia running state in the examples, this step is executed for confirmation and not necessarily needed and may be omitted.

Although the intake valve 26 is controlled to the delay side or the small lift side in advance during running in the cylinder resting inertia running mode in the examples, the intake valve 26 may be controlled when the reacceleration request is output.

Although, by way of example, the engine 12 includes the eight cylinders 11 in the examples, the number of cylinders is not limited thereto and may be changed as needed. The number of the cylinders stopped during the cylinder resting inertia running mode is not particularly limited.

Although both the intake valve 26 and the exhaust valve 28 are closed during the cylinder resting inertia running mode in the examples, this is not a limitation and the present invention may be implemented in the form of opening both the intake valve 26 and the exhaust valve 28 or stopping either valve, for example, and is not limited to the form of closing the both valves 26, 28.

Although the intake valve 26 and the exhaust valve 28 are stopped in the closed valve state at the time of the cylinder resting inertia running mode in the examples, a piston may be separated from the crankshaft by a clutch etc. and stopped instead of stopping the intake/exhaust valves.

Although the engine 12 is put in the idle operation or the fuel supply is stopped to stop the rotation in the neutral inertia running mode in the examples, the engine 12 may not necessarily be limited to the idle operation and may appropriately be rotated at a rotation speed as long as the rotation speed enables self-running and is within a rotation speed range in which the fuel consumption amount can be reduced.

Although the phase of the intake valve 26 is controlled to the advance side or delay side and the valve lift amount of the intake valve 26 is controlled to the increase side or the decrease side as needed by the variable valve mechanism 30 at the time of return from the cylinder resting inertia running mode to the normal running mode in the examples, the state during the normal operation may be maintained. Specifically, the present invention is not particularly limited as long as the air-fuel mixture amount (intake air amount) sucked into the cylinder is made larger at the time of return from the neutral inertia running mode to the normal running mode as compared to the case of return from the cylinder resting inertia running mode to the normal running mode.

The above description is merely an embodiment and the present invention can be implemented in variously modified and improved forms based on the knowledge of those skilled in the art.

NOMENCLATURE OF ELEMENTS

11: cylinders
12: engine
20: wheels
30: variable valve mechanism (variable mechanism)
50: electronic control device (running control device)
C1: clutch

The invention claimed is:

1. A running control device of a vehicle including an engine with a plurality of cylinders, a clutch connecting/disconnecting a power transmission path between the engine and wheels, and a variable mechanism being configured to vary an intake air amount sucked into the cylinders of the engine, the running control device of a vehicle configured to perform:
    a normal running mode performed by transmitting a drive force of the engine to the wheels,
    a neutral inertia running mode performed by disconnecting the power transmission path between the engine and the wheels, and
    a cylinder resting inertia running mode performed by resting at least a part of the cylinders of the engine while the power transmission path between the engine and the wheels is connected,
    the running control device of the vehicle configured to make the intake air amount sucked into the cylinders larger at a time of return from the neutral inertia running mode to the normal running mode as compared to a case of return from the cylinder resting inertia running mode to the normal running mode.

2. The running control device of a vehicle of claim 1, wherein the variable mechanism is a variable valve mechanism configured to change at least one of valve-opening timing, a lift amount, and a working angle of an intake valve of the engine.

3. The running control device of a vehicle of claim 1, wherein the neutral inertia running mode is performed with the engine put in idle operation or with fuel supply to the engine stopped.

* * * * *